US008168725B2

(12) United States Patent
Roth et al.

(10) Patent No.: US 8,168,725 B2
(45) Date of Patent: May 1, 2012

(54) DEGRADATION OF POLYPROPYLENE WITH HYDROXYLAMINE ESTER COMPOSITIONS

(75) Inventors: Michael Roth, Lautertal (DE); Peter Nesvadba, Marly (CH); David E. Horst, Danbury, CT (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/098,557

(22) Filed: May 2, 2011

(65) Prior Publication Data
US 2011/0207892 A1 Aug. 25, 2011

Related U.S. Application Data

(62) Division of application No. 11/661,450, filed as application No. PCT/EP2005/054268 on Aug. 31, 2005, now Pat. No. 7,956,109.

(30) Foreign Application Priority Data

Sep. 9, 2004 (EP) .................................... 04104354

(51) Int. Cl.
*C08F 8/34* (2006.01)
*C08L 23/00* (2006.01)
*C09K 3/00* (2006.01)
*C08K 5/34* (2006.01)
*C08K 5/3435* (2006.01)
*C08K 5/42* (2006.01)
*C08K 5/36* (2006.01)
*C08G 73/10* (2006.01)

(52) U.S. Cl. ................ 525/333.9; 525/240; 252/182.17; 524/99; 524/102; 524/157; 524/392; 526/351

(58) Field of Classification Search ................. 525/240, 525/333.9; 526/351; 252/182.17; 524/99, 524/102, 157, 392
See application file for complete search history.

(56) References Cited

U.S. PATENT DOCUMENTS

| 3,036,034 | A | * | 5/1962 | Rumscheidt | ................ 524/166 |
| 3,361,713 | A | | 1/1968 | Meyer et al. | |
| 4,101,720 | A | | 7/1978 | Taylor et al. | |
| 2002/0161075 | A1 | | 10/2002 | Sassi | |
| 2003/0216494 | A1 | * | 11/2003 | Roth et al. | ..................... 524/95 |

FOREIGN PATENT DOCUMENTS

| JP | 49-045158 U | 4/1974 |
| JP | 49-099549 U | 8/1974 |
| WO | 01/90113 A1 | 11/2001 |

OTHER PUBLICATIONS

J.Z. Stefanska et al., Pharmazie, vol. 53, (1998) pp. 190-192.
English language translation of JP 49-045158.
English language translation of JP 49-099549.

* cited by examiner

*Primary Examiner* — Timothy J. Kugel
*Assistant Examiner* — Atnaf Admasu
(74) *Attorney, Agent, or Firm* — Tyler A. Stevenson

(57) ABSTRACT

The invention relates to novel composition comprising hydroxylamine esters and thio compounds, which are suitable for lowering the molecular weight of polypropylene, propylene copolymers or polypropylene blends and result in an excellent degradation performance at temperatures below 220° C.

5 Claims, No Drawings

DEGRADATION OF POLYPROPYLENE WITH HYDROXYLAMINE ESTER COMPOSITIONS

This application is a divisional of application Ser. No. 11/661,450, now U.S. Pat. No. 7,956,109, which is a 371 of international app. No. PCT/EP 2005/054268, filed Aug. 31, 2005, the contents of which applications are incorporated by reference.

The invention relates to compositions suitable for lowering the molecular weight of polypropylene, propylene copolymers or polypropylene blends.

The controlled preparation of polyolefin grades (polymer types having different molar masses, melt viscosities, densities, molar mass distributions, etc.) by customary compounding methods, for example by extrusion or injection moulding, is a routine process employed by polymer manufacturers and polymer processors/compounders.

The setting of the desired parameters, for example the melt viscosity, by means of this polymer process step is critically dependent on the controlled reactivity and mode of action of the additives employed.

The use of free-radical formers for modifying the melt viscosity (rheology) of polyolefins is a generally known method. Whether it results in a lowering of the molecular weight (degradation) or an increase in the molecular weight (cross linking) depends primarily on the chemical structure of the polyolefin.

The reaction of a polymer of the polypropylene type with a free-radical former during a polymer-processing process generally results in the degradation of the polymer, whereas polymers of the polyethylene type tend to cross-linking. Examples that may be mentioned here are polyethylene types, which are obtainable by means of Phillips catalysts (LDPE) or metallocene catalysts (LLDPE). Exceptions are the polyethylene types prepared by the Ziegler process, which likewise tend to undergo chain degradation when processed in the presence of free-radical formers.

In the case of copolymers and terpolymers or copolymer blends, high proportions of propylene produce polypropylene-like behaviour, while high proportions of ethylene result in polyethylene-like behaviour. If the above-mentioned copolymers and terpolymers or copolymer blends comprise proportions of multiply unsaturated olefins, the probability of cross linking decreases with decreasing concentration of free double bonds.

The controlled degradation of polypropylene (PP) to give a product having a lower molecular weight and a narrower molecular weight distribution is a commercially important process for producing 'controlled rheology' polypropylene (CR-PP). While specific PP grades ("reactor grades") are obtainable by optimisation of the synthesis process or the catalyst systems (metallocene catalyst, Ziegler catalyst), standard PP grades are frequently modified in process technology by means of a processing step following the synthesis.

Known degradation processes proceed either thermally, in particular at temperatures above 280° C., or in the presence of free-radical generators. In process technology, the free-radical-induced process is carried out in extruders or injection-moulding machines at temperatures above 180° C. Suitable free-radical generators are organic peroxides which are added during the processing step in diluted form (PP Mastermix, diluted in oil, stabilized on inorganic supports) or directly as a liquid. Under the given processing conditions, the peroxide disintegrates into free radicals, which initiate the chain cleavage reactions and form polymers having the desired rheological properties (melt viscosities). The degradation of a PP to form a product having a lower molecular weight (higher melt flow rate (MFR)) is generally referred to as a viscosity-breaking or vis-breaking process.

CR-PP grades are mainly used for fibre applications and injection-moulding applications in which low melt viscosities are a prerequisite for economical processing. A wide range of melt viscosities or molecular weights is nowadays required in process technology.

A further parameter that influences the processing behaviour of the polymer, in addition to the molecular weight, is the molecular weight distribution (MWD). While polymer grades having broad MWDs display improved orientation behaviour of the polymer chains at low pull-off speeds in a fibre spinning process, the reverse is the case for high pull off speeds and broad MWDs. For this reason, narrow MWDs are essential at high pull-off speeds in order to achieve improved continuity in the spinning process.

The use of peroxides is a drawback, since only a restricted "processing temperature window" is available because of their decomposition temperatures, which are generally below the customary temperatures of polymer processing. In addition, strict safety regulations have to be adhered to during storage, handling and processing of peroxides. A further disadvantage of peroxides is the impossibility of decomposition-free melt compounding with polymers.

Apart from peroxides, other sources of free radicals are also known, e.g. C-radical generators based on cumyl systems, but these can be used only at temperatures above 280° C. WO 97/49737 describes a process for reducing the molecular weight of polymers at temperatures above 280° C. using so-called NOR-HALS (HALS: Hindered Amino Light Stabilisers) compounds containing the group:

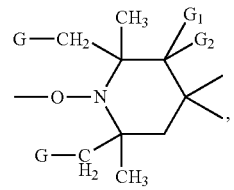

Wherein G is hydrogen or methyl and $G_1$ and $G_2$ are each hydrogen, methyl or are together oxo. These known NOR-HALS compounds produce appreciable polymer degradation only at temperatures above 280° C. Since most polymers are processed below this temperature at 160-280° C., there is a particular need for compounds, which can be used at correspondingly lower temperatures.

WO 01/90113 discloses a process for reducing the molecular weight of polypropylene, propylene copolymers or polypropylene blends, wherein a hydroxylamine ester of the formula:

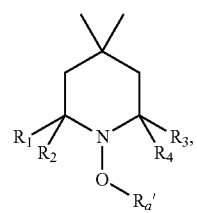

Wherein among others $R_a'$ is a monoacyl radical and $R_1$-$R_4$ are alkyl-substituents; is added to the polypropylene polymers to be degraded, and the mixture is heated to temperatures below 280° C.

The present invention relates to the problem of improving that prior art process further by lowering the process temperature and obtaining polymers of a more homogeneous (narrow) molecular weight distribution and a reduced level of oligomeric and volatile decomposition products.

It has now surprisingly been found that the combination of a hydroxylamine ester corresponding to the formula above and selected thio compounds shows a significant synergistic effect, which results in an excellent degradation performance at temperatures below 220° C.

The present invention relates to a polymer composition comprising
a) At least one hydroxylamine ester of the formula:

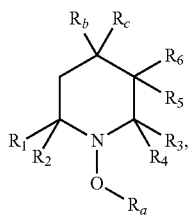
(I)

Wherein $R_a$ represents acyl;
One of $R_b$ and $R_c$ represents hydrogen and the other one represents a substituent; or
$R_b$ and $R_c$ both represent hydrogen or identical or different substituents; or
$R_b$ and $R_c$ together represent oxygen;
$R_1$-$R_4$ each represent $C_1$-$C_6$alkyl; and
$R_5$ and $R_6$ each represent independently of one another hydrogen, $C_1$-$C_6$alkyl or $C_6$-$C_{10}$aryl; or
$R_5$ and $R_6$ together represent oxygen; and
b) At least one sulphur compound of the formula $R_1$—S—A (II), Wherein $R_1$ represents an organic substituent and A represents hydrogen or the group

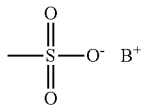

Wherein $B^+$ represents a cation or a cationic group; and
c) Polypropylene, propylene copolymers or polypropylene blends.

The terms and expressions used in the description of the invention preferably have the following meanings:
Component a)
In a hydroxylamine ester (I) the term acyl with regard to the definition of $R_a$ preferably represents an acyl radical selected from the group consisting of —C(=O)—H, —C(=O)—$C_1$-$C_{19}$alkyl, —C(=O)—$C_2$-$C_{19}$alkenyl, —C(=O)—$C_2$-$C_4$alkenyl-$C_6$-$C_{10}$aryl, —C(=O)—$C_6$-$C_{10}$aryl, —C(=O)—O—$C_1$-$C_6$alkyl, —C(=O)—O—$C_6$-$C_{10}$aryl, —C(=O)—NH—$C_1$-$C_6$alkyl, —C(=O)—NH—$C_6$-$C_{10}$aryl and —C(=O)—N($C_1$-$C_6$alkyl)$_2$; $C_1$-$C_{19}$alkyl in the acyl group $R_a$ is, for example, $C_1$-$C_6$alkyl, e.g. methyl, ethyl, n-propyl or isopropyl or n-, sec- or tert-butyl or straight-chain or branched pentyl or hexyl, or $C_7$-$C_{19}$alkyl, e.g. straight-chain or branched heptyl, octyl, isooctyl, nonyl, tert-nonyl, decyl or undecyl, or straight-chain $C_{11}$-$C_{19}$alkyl, which together with the —(C=O)— radical forms $C_{14}$-$C_{20}$alkanoyl having an even number of C-atoms, e.g. lauroyl (C12), myristoyl (C14), palmitoyl (C16) or stearoyl (C18).

$C_6$-$C_{10}$Aryl is, for example, carbocyclic monoaryl or diaryl, preferably monoaryl, e.g. phenyl, which may be mono-substituted or disubstituted by suitable substituents, e.g. $C_1$-$C_4$alkyl, e.g. methyl, ethyl or tert-butyl, $C_1$-$C_4$alkoxy, e.g. methoxy or ethoxy, or halogen, e.g. chlorine. In the case of disubstitution, the 2- and 6-positions are preferred.

The above-mentioned acyl radical $R_a$ may be substituted on the free valences by suitable substituents, e.g. fluorine or chlorine, and is preferably formyl, acetyl, trifluoroacetyl, pivaloyl, acryloyl, methacryloyl, oleoyl, cinnamoyl, benzoyl, 2,6-xyloyl, tert-butoxycarbonyl, ethylcarbmoyl or phenylcarbamoyl.

$C_1$-$C_6$Alkyl as $R_1$-$R_4$ is preferably $C_1$-$C_2$alkyl, in particular $C_1$-$C_2$alkyl, e.g. methyl or ethyl.

In preferred embodiments, $R_1$-$R_4$ are methyl or ethyl. Alternatively, from one to three substituents $R_1$-$R_4$ are ethyl. The remaining substituents are then methyl.

$R_5$ and $R_6$ are preferably hydrogen. $C_1$-$C_6$Alkyl or $C_6$-$C_{10}$aryl as $R_5$ and $R_6$ are preferably methyl or phenyl.

The hydroxylamine esters (I) are known or can be prepared by known methods, e.g. by acylation of the corresponding >N—OH compound in a customary esterification reaction with an acid $R_a$—OH that introduces the group $R_a$ and corresponds to an acyl group selected, for example, from the group consisting of —C(=O)—H, —C(=O)—$C_1$-$C_{19}$alkyl, —C(=O)—$C_2$-$C_{19}$alkenyl, —C(=O)—$C_2$-$C_4$alkenyl-$C_6$-$C_{10}$aryl, —C(=O)—$C_6$-$C_{10}$aryl, —C(=O)—O—$C_1$-$C_6$alkyl, —C(=O)—O—$C_6$-$C_{10}$aryl, —C(=O)—NH—$C_1$-$C_6$alkyl, —C(=O)—NH—$C_6$-$C_{10}$aryl and —C(=O)—N($C_1$-$C_6$alkyl)$_2$, or a reactive functional derivative thereof, e.g. the acid halide $R_a$—X, e.g. the acid chloride, or anhydride, e.g. ($R_a$)$_2$O. The hydroxylamine esters (I) and methods for their preparation are described in WO 01/90113.

According to a preferred embodiment the hydroxylamine ester (I) of component a) is selected from the group consisting of sterically hindered amine derivatives of the formula:

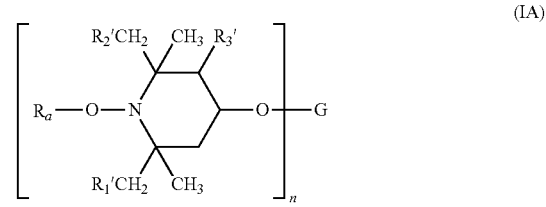
(IA)

Wherein n represents an integer from 1 to 4;
$R_a$ represents acyl, $R_1'$, $R_2'$ and $R_3'$ are each, independently of one another, hydrogen or methyl; and G has the following meanings:
When n=1,
G represents hydrogen, $C_1$-$C_{18}$alkyl which may be interrupted by one or more oxygen atoms, 2-cyanoethyl, benzyl, glycidyl, the $C_2$-$C_{18}$acyl radical of an aliphatic carboxylic acid, the $C_7$-$C_{15}$acyl radical of a cycloaliphatic carboxylic acid, the $C_3$-$C_5$acyl radical of an α,β-unsaturated carboxylic acid, or the $C_7$-$C_{15}$acyl radical of an aromatic carboxylic acid, wherein the carboxylic acid groups may be substituted in the aliphatic, cycloaliphatic or aromatic part by 1 to 3-000Z$^1$ groups, wherein Z$^1$ represents hydrogen, C$_1$-C$_{20}$alkyl, C$_3$-C$_{12}$alkenyl, C$_5$-C$_7$cycloalkyl, phenyl or benzyl; or When n=2, G represents C$_2$-C$_{12}$alkylene, C$_4$-C$_{12}$alkenylene, xylylene, the C$_2$-C$_{36}$acyl radical of an aliphatic dicarboxylic acid, the C$_8$-C$_{14}$acyl radical of a cycloaliphatic or aromatic dicarboxylic acid, or the C$_8$-C$_{14}$acyl radical of an aliphatic, cycloaliphatic or aromatic dicarbamic acid, where the dicarboxylic acid group may be substituted in the aliphatic, cycloaliphatic or aromatic part by 1 or 2-COOZ$^1$ groups, wherein Z$^1$ is as defined above; or When n=3, G represents the trivalent acid radical of an aliphatic, cycloaliphatic or aromatic tricarboxylic acid, wherein the acid radical may be substituted in the aliphatic, cycloaliphatic or aromatic part by the group-COOZ$^1$, wherein Z$^1$ is as defined above, or represents the trivalent acid radical of an aromatic tricarbamic acid or a phosphorus-containing acid or a trivalent silyl radical; or, When n=4, G represents the tetravalent acid radical of an aliphatic, cycloaliphatic or aromatic tetra-carboxylic acid.

According to a particularly preferred embodiment n represents in a compound (IA) 1 or 2, R$_1$', R$_2$' and R$_3$' each represent hydrogen, R$_a$ represents C$_2$-C$_{18}$alkanoyl or C$_3$-C$_6$alkenoyl and G represents the C$_{12}$-C$_{18}$acyl radical of an aliphatic monocarboxylic acid or the C$_4$-C$_{12}$acyl radical of an aliphatic dicarboxylic acid.

According to another preferred embodiment the hydroxylamine ester (I) of component a) is selected from the group consisting of sterically hindered amine derivatives of the formula:

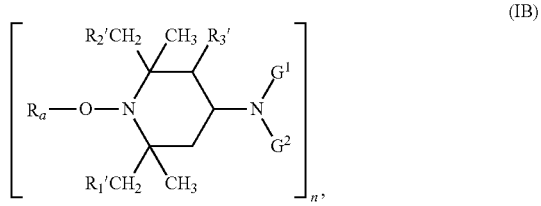

(IB)

Wherein n represents 1 or 2, R$_a$, R$_1$', R$_2$' and R$_3$' are as defined under the formula IA;

G$^1$ represents hydrogen, C$_1$-C$_{12}$alkyl, C$_2$-C$_5$hydroxyalkyl, C$_5$-C$_7$cycloalkyl, C$_7$-C$_8$aralkyl, C$_2$-C$_{18}$alkanoyl, C$_3$-C$_5$alkenoyl or benzoyl or a group:

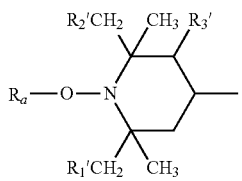

Wherein R$_a$, R$_1$', R$_2$' and R$_3$' are as defined above and G$^2$ has the following meanings:

When n=1,

G$^2$ represents hydrogen, C$_1$-C$_{18}$alkyl, C$_3$-C$_8$alkenyl, C$_5$-C$_7$cycloalkyl, C$_1$-C$_4$alkyl, C$_1$-C$_4$alkyl substituted by hydroxy, cyano, alkoxycarbonyl or carbamide, glycidyl or the groups —CH$_2$—CH(OH)—Z or CONH—Z, wherein Z is hydrogen, methyl or phenyl; or When n=2, G$^2$ represents hydrogen, C$_2$-C$_{12}$alkylene, C$_6$-C$_{12}$arylene, xylylene or the —CH$_2$CH(OH)—CH$_2$— or —CH$_2$—CH(OH)—CH$_2$—O-D-O— groups, wherein D represents C$_2$-C$_{10}$alkylene, C$_6$-C$_{15}$arylene or C$_6$-C$_{12}$cycloalkylene; or, provided that G$^1$ is other than alkanoyl, alkenoyl or benzoyl, G$^2$ additionally represents 1-oxo-C$_2$-C$_{12}$alkylene, the bivalent radical of an aliphatic, cycloaliphatic or aromatic dicarboxylic acid or dicarbamic acid or the —CO— group; or, When n=1, G$^1$ and G$^2$ together represent the bivalent radical of an aliphatic, cycloaliphatic or aromatic 1,2-dicarboxylic acid or 1,3-dicarboxylic acid.

According to a particularly preferred embodiment the hydroxylamine ester (I) of component a) is selected from the group consisting of sterically hindered amine derivatives of the formula:

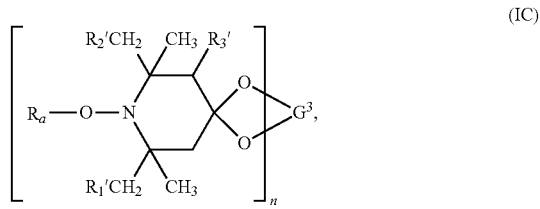

(IC)

Wherein n represents 1 or 2 and R$_a$, R$_1$', R$_2$' and R$_3$' are as defined under the formula IA; and, when n=1 G$^3$ represents C$_2$-C$_{10}$alkylene, C$_2$-C$_8$hydroxyalkylene or C$_4$-C$_{32}$acyloxy-C$_2$-C$_{10}$alkylene, C$_4$-C$_{32}$acyloxy-C$_1$-C$_4$alkyl-C$_2$-C$_{10}$alkylene or, when n=2, represents the group (—CH$_2$)$_2$C(CH$_2$—)$_2$.

According to a highly preferred embodiment the hydroxylamine ester (I) of component a) is selected from the group consisting of sterically hindered amine derivatives of the formula:

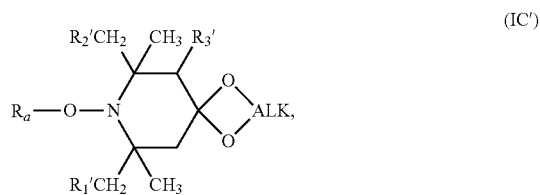

(IC')

Wherein R$_a$, R$_1$', R$_2$' and R$_3$' are as defined under the formula IA and ALK represents C$_2$-C$_{10}$alkylene or C$_3$-C$_{10}$alkylene substituted by at least one substituent selected from the group consisting of hydroxy, C$_4$-C$_{32}$acyloxy and C$_4$-C$_{32}$acyloxy-C$_1$-C$_4$alkyl.

According to another highly preferred embodiment the hydroxylamine ester (I) of component a) is selected from the group consisting of sterically hindered amine derivatives of the formula:

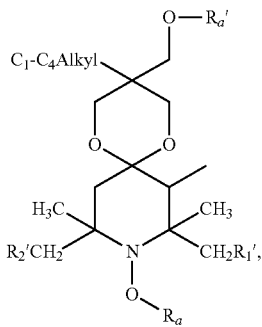

(IC″)

Wherein $R_1'$ and $R_2'$ independently of one another represent hydrogen or methyl;
$R_a$ represents $C_1$-$C_8$ alkanoyl; and
$R_a'$ represents $C_8$-$C_{22}$alkanoyl.

According to a most preferred embodiment the hydroxylamine ester (I) of component a) is selected from the group consisting of sterically hindered amine derivatives of the formula:

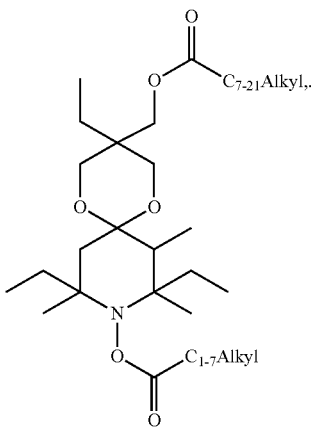

(IC‴)

According to another embodiment of the invention the hydroxylamine ester (I) of component a) is selected from the group consisting of sterically hindered amine derivatives of the formulae:

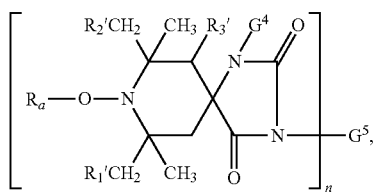

(ID)

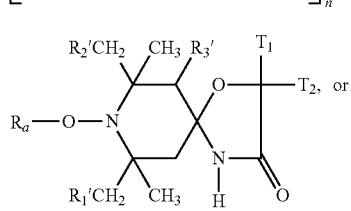

(IE)

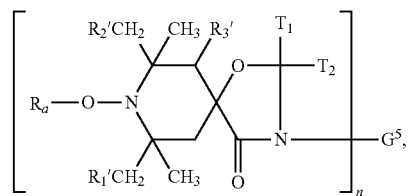

(IF)

Wherein
n represents 1 or 2;
$R_a$, $R_1'$, $R_2'$ and $R_3'$ are as defined under the formula IA,
$G^4$ represent hydrogen, $C_1$-$C_{12}$alkyl, allyl, benzyl, glycidyl or $C_2$-$C_6$alkoxyalkyl; and
$G^5$ has the following meanings:
When n=1,
$G^5$ represents hydrogen, $C_1$-$C_{12}$alkyl, $C_3$-$C_5$alkenyl, $C_7$-$C_9$aralkyl, $C_5$-$C_7$cycloalkyl, $C_2$-$C_4$hydroxyalkyl, $C_2$-$C_6$alkoxyalkyl, $C_6$-$C_{10}$aryl, glycidyl or the groups —(CH$_2$)$_p$—COO-Q or —(CH$_2$)$_p$—O—CO-Q, wherein p represents 1 or 2 and Q represents $C_1$-$C_4$alkyl or phenyl; or
When n=2,
$G^5$ represents $C_2$-$C_{12}$alkylene, $C_4$-$C_{12}$alkenylene, $C_6$-$C_{12}$arylene, the group

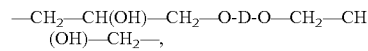

Wherein D represents $C_2$-$C_{10}$alkylene, $C_6$-$C_{15}$arylene or $C_6$-$C_{12}$-cycloalkylene, or the group

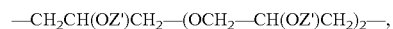

Wherein Z' represents hydrogen, $C_6$a$_{15}$alkyl, allyl, benzyl, $C_2$-$C_{12}$alkanoyl or benzoyl,
$T^1$ and $T^2$ each represent, independently of one another, hydrogen, $C_1$-$C_{18}$alkyl, $C_6$-$C_{10}$aryl or $C_7$-$C_9$aralkyl, each of which may be substituted by halogen or $C_1$-$C_4$alkyl, or
$T^1$ and $T^2$ together with the carbon atom connecting them form a $C_5$-$C_{14}$cycloalkane ring.

According to another preferred embodiment of the invention, the hydroxylamine ester (I) of component a) is selected from a compound of the formula:

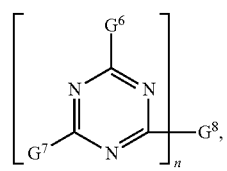

(IG)

Wherein n=1 or 2 and $G^6$ represents the group:

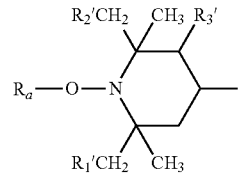

Wherein $R_a$, $R_1'$, $R_2'$ and $R_3'$ are as defined under the formula IA;

E represents —O— or —NG$^1$-;

A represents $C_2$-$C_6$alkylene or —(CH$_2$)$_3$—O—;

x is either 0 or 1;

$G^1$ represents hydrogen, $C_1$-$C_{12}$alkyl, $C_2$-$C_5$hydroxyalkyl or $C_5$-$C_7$cycloalkyl;

$G^7$ is identical with $G^6$ or represents one of the groups —NG$^9$G$^{10}$, —OG$^{11}$, —NHCH$_2$OG$^{11}$ or —N(CH$_2$OG$^{11}$)$_2$;

When n=1, $G^8$ is identical with $G^6$ or $G^7$; and,

When n=2, $G^8$ represents the group -E-B-E-, wherein B represents $C_2$-$C_8$alkylene or $C_2$-$C_8$alkylene interrupted by 1 or 2-NG$^9$-groups, and $G^9$ represents $C_1$-$C_{12}$alkyl, cyclohexyl, benzyl or $C_1$-$C_4$hydroxyalkyl or the groups:

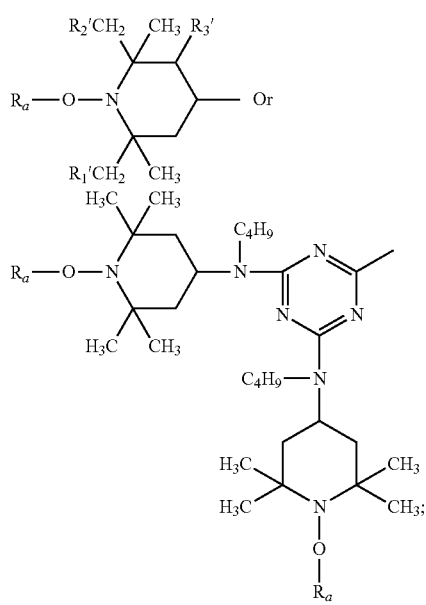

$G^{10}$ represents $C_1$-$C_{12}$alkyl, cyclohexyl, benzyl or $C_1$-$C_4$-hydroxyalkyl; and $G^{11}$ represents hydrogen, $C_1$-$C_{12}$alkyl or phenyl; and $G^9$ and $G^{10}$ together represent $C_4$-$C_5$alkylene or $C_4$-$C_5$oxaalkylene.

According to another alternative embodiment of the invention the hydroxylamine ester (I) of component a) is selected from a compound of the formula:

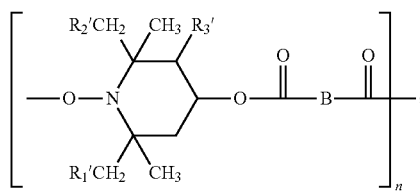

(IH)

Wherein n represents an integer greater than two and $R_1'$, $R_2'$ and $R_3'$ are as defined under the formula IA; and B is a bivalent substituent.

The structural formulae of some preferred compounds are shown in the Table below:

TABLE

| Compound No. | Structural formula |
|---|---|
| 1 | |
| 2 | |
| 3 | |
| 4 | |
| 5 | |
| 6 | |
| 7 | |
| 8 | |

TABLE-continued

| Compound No. | Structural formula |
|---|---|
| 9 | |
| 10 | |
| 11 | |
| 12 | |
| 13 | |
| 14 | |
| 15 | |
| 16 | |
| 17 | |
| 18 | |
| 19 | |
| 20 | |
| 21 | |
| 22 | |
| 23 | |

TABLE-continued
| Compound No. | Structural formula |
|---|---|
| 24 | 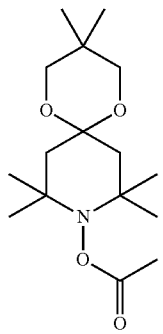 |
| 25 | 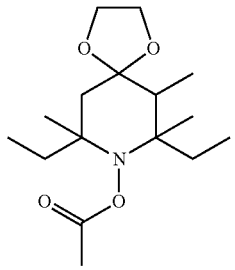 |
| 26 | 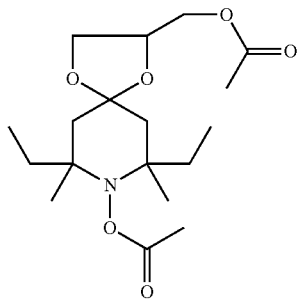 |
| 27 | 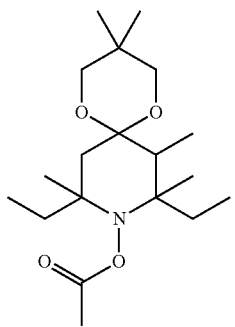 |
| 28 | 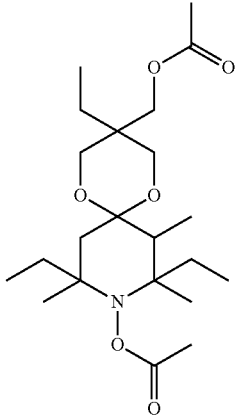 |
| 29 | 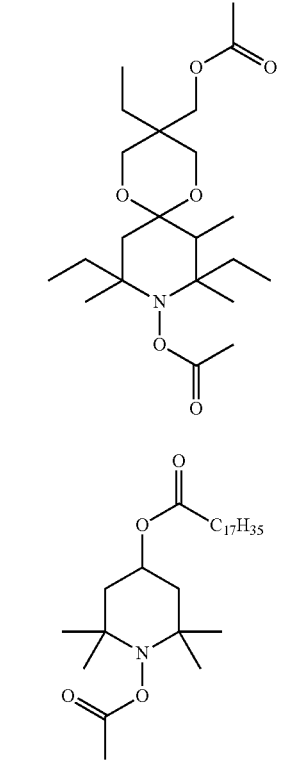 |
| 30 | 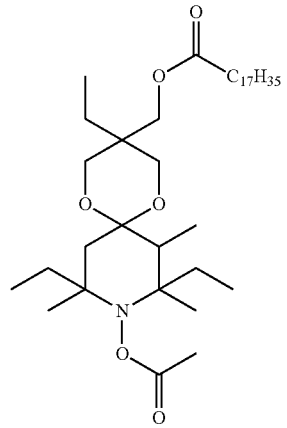 |
| 31 | 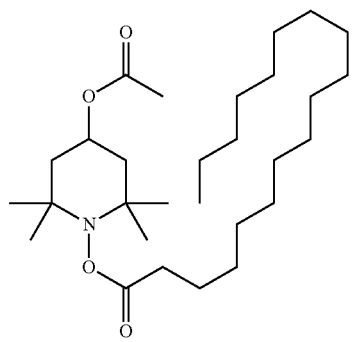 |

TABLE-continued

| Compound No. | Structural formula |
|---|---|
| 32 | 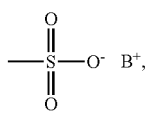 |
| 33 | |
| 34 | |

The preparation of these known compounds is described in WO 01/90113. The hydroxylamine ester (I) of component a) is present in the polymer composition to be degraded at levels of 10-5000 ppm, preferably 50-1000 ppm.

Component b)

In a sulphur compound (II) $R_1$ represents an organic substituent, which is attached to the sulphur atom with a carbon atom. A represents hydrogen or the group $$-\overset{O}{\underset{O}{S}}-O^-\ B^+,$$

Wherein $B^+$ represents a cation or a cationic group.

An organic substituent $R_1$, which is attached to the sulphur atom with a carbon atom, is, for example, $C_8$-$C_{22}$alkyl, hydroxy-$C_2$-$C_8$alkyl, mercapto-$C_2$-$C_8$alkyl, mercapto-$C_8$-$C_{20}$alkyl interrupted by at least one —NH—, mercapto-$C_8$-$C_{18}$alkyl substituted by at least one hydroxy, $C_6$-$C_{10}$aryl, $C_6$-$C_{10}$aryl substituted by at least one substituent selected from the group consisting of $C_1$-$C_4$alkyl, 4-thiophenyl and 3-methyl-4-thiophenyl, or $C_6$-$C_{10}$aryl-$C_1$-$C_4$alkyl.

$R_1$ defined as $C_8$-$C_{22}$alkyl is straight-chain or branched $C_8$-$C_{18}$alkyl e.g. n-octyl, isooctyl types, e.g. 3,4-, 3,5- or 4,5-dimethyl-1-hexyl or 3- or 5-methyl-1-heptyl, other branched octyl types, such as 1,1,3,3-tetramethylbutyl or 2-ethylhexyl, n-nonyl, 1,1,3-trimethylhexyl, n-decyl, n-undecyl, 1-methylundecyl, 2-n-butyl-n-octyl, isotridecyl, 2-n-hexyl-n-decyl, 2-n-octyl-n-dodecyl or straight-chain $C_{12}$-$C_{19}$alkyl, e.g. lauryl (C12), myristyl (C14), cetyl (C16) or n-octadecyl (C18).

$R_1$ defined as hydroxy-$C_2$-$C_8$alkyl is, for example, 2-hydroxyethyl, 2- or 3-hydroxypropyl, 4-hydroxy-2-hexyl or 4-hydroxy-3-hexyl.

$R_1$ defined as mercapto-$C_2$-$C_8$alkyl is, for example, $C_2$-$C_8$alkyl substituted at the terminal carbon atom by a thiol (mercapto) group, e.g. 6-mercapto-n-hexyl or 5-mercapto-n-pentyl.

$R_1$ defined as mercapto-$C_8$-$C_{20}$alkyl interrupted by at least one —NH— is exemplified by the substituted diamino-$C_2$-$C_4$alkylene groups as shown below:

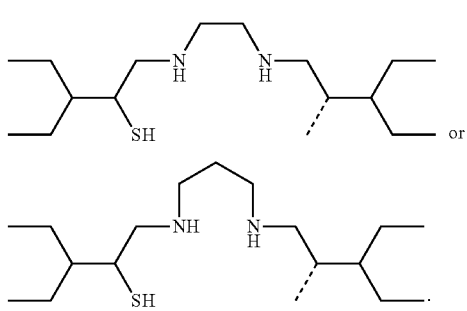

$R_1$ defined as mercapto-$C_8$-$C_{18}$alkyl substituted by at least one hydroxy is exemplified by the following mercaptoethylene glycol groups:

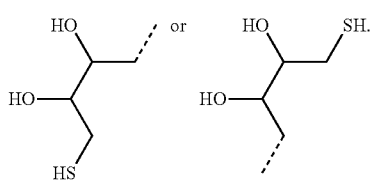

$R_1$ defined as $C_6$-$C_{10}$aryl is preferably phenyl.
$R_1$ defined as $C_6$-$C_{10}$aryl substituted by at least one substituent selected from the group consisting of $C_1$-$C_4$alkyl, 4-thiophenyl and 3-methyl-4-thiophenyl is exemplified by the following partial formula:

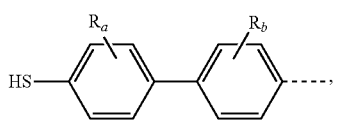

Wherein $R_a$ and $R_b$ independently of one another represent hydrogen or methyl.

$R_1$ defined as $C_6$-$C_{10}$aryl-$C_1$-$C_4$alkyl is, for example, benzyl, phen-1-ethyl or phenyl-2-ethyl.

A cation or a cationic group $B^+$ is for example, an alkali metal cation, e.g. the sodium or potassium ion, the ammonium ion, the tri-$C_1$-$C_4$alkylammonium ion, e.g. the tetramethyl- or tetraethylammonium ion, or the cholinyl cation.

Suitable sulphur compounds (II), wherein $R_1$ represents the above defined organic substituent, which is attached to the sulphur atom with a carbon atom and A represents hydrogen or the group

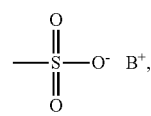

Wherein $B^+$ represents the above defined cation or a cationic group, are represented by the following structural formulae:

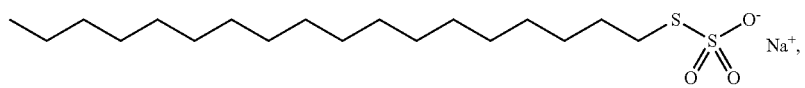

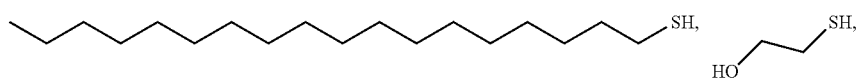

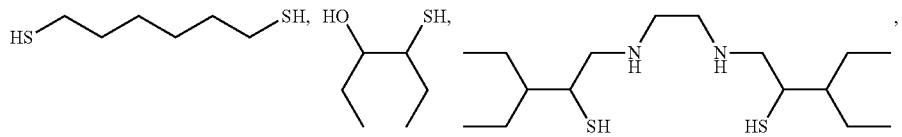

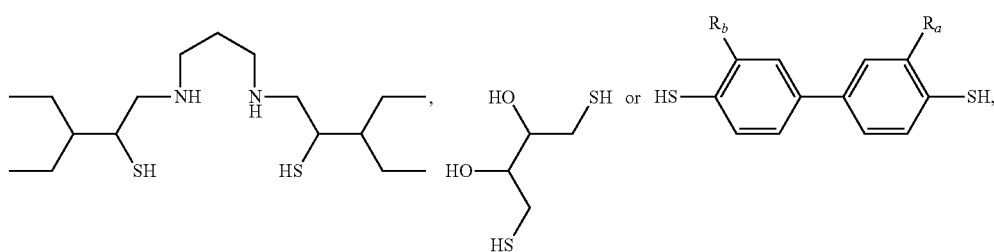

Wherein $R_a$ and $R_b$ independently of one another represent hydrogen or methyl.

The sulphur compounds (II) are known or can be obtained by known methods.

Component c)

The polypropylene-type polymers to be degraded can encompass propylene homopolymers, propylene copolymers and polypropylene blends. Propylene copolymers may contain various proportions up to 90%, preferably up to 50%, of comonomers. Examples of comonomers are: olefins such as 1-olefins, e.g. ethylene, 1-butene, 1-pentene, 1-hexene, 1-heptene or 1-octene, isobutylene, cycloolefins, e.g. cyclopentene, cyclohexene, norbornene or ethylidenenorborne, dienes such as butadiene, isoprene, 1,4-hexadiene, cyclopentadiene, dicyclopentadiene or norbornadiene; also acrylic acid derivatives and unsaturated carboxylic anhydrides such as maleic anhydride.

Polypropylene blends which can be used are mixtures of polypropylene with polyolefins. Examples are blends of polypropylene with polyethylene selected from the group consisting of high density polyethylene (HDPE), high molecular weight high density polyethylene (HMW HDPE), ultra high molecular weight high density polyethylene (UHMW HDPE), medium density polyethylene (MDPE), low density polyethylene (LDPE), linear low density polyethylene (LLDPE), branched low density polyethylene (BLDPE) and ethylene-propylene-diene terpolymers (EPDM) containing small proportions of diene.

A highly preferred embodiment of the invention relates to a polymer composition comprising a) At least one hydroxylamine ester of the formula:

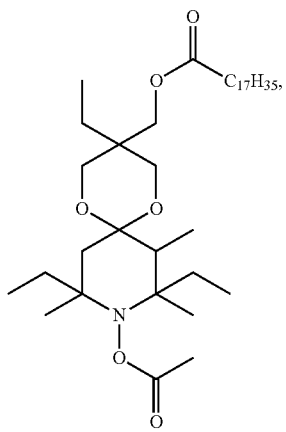

b) At least one mercaptane of the formula

 (II'),

Wherein $R_1$ represents $C_8$-$C_{18}$alkyl; and c) Polypropylene, propylene copolymers or polypropylene blends.

Particularly relevant is a polymer composition comprising a) At least one hydroxylamine ester of the formula:

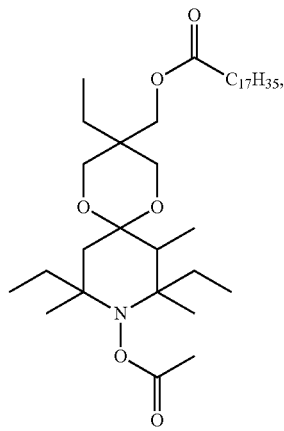

b) At least one S-alkylthiosulphate of the formula

 (II'')

Wherein $R_1$ represents $C_8$-$C_{18}$alkyl and $B^+$ represents a cation or an cationic group; and c) Polypropylene, propylene copolymers or polypropylene blends.

The polymer composition comprising the above defined components a), b) and c) is applied in a process for reducing the molecular weight of the above-defined polypropylene, propylene copolymers of polypropylene blends. That process is another embodiment of the present invention.

Another embodiment of the invention is a composition comprising the above defined components a) At least one hydroxylamine ester or a polymer of a hydroxylamine ester (I), wherein $R_a$, $R_b$, $R_c$ and $R_1$-$R_6$ are as defined above; and b) At least one sulphur compound of the formula (II), wherein $R_1$ and A are as defined above; to be added as mixture or as individual components to the polypropylene, propylene copolymers or polypropylene blend to be degraded.

The above-described compositions comprising hydroxylamine esters (I) and sulphur compounds (II) are applicable as precursor mixtures or pre-formulated mixtures for reducing the molecular weight of polypropylene, propylene copolymers and polypropylene blends to be degraded, where they effect degradation of the polymer chains like the peroxides customarily used in the prior art.

The inventive process is characterised in that a composition comprising a) At least one hydroxylamine ester or a polymer of a hydroxylamine ester (I), wherein $R_a$, $R_b$, $R_c$ and $R_1$-$R_6$ are as defined above; and b) At least one sulphur compound of the formula (II), wherein $R_1$ and A are as defined above, is added to the polypropylene, propylene copolymers or polypropylene blend to be degraded and the mixture is heated.

The addition to the polypropylene, propylene copolymers or polypropylene blend can be carried out in all customary mixing machines in which the polymer is melted and mixed with the additives. Suitable machines are known to those skilled in the art. They are predominantly mixers, kneaders and extruders.

According to a highly preferred embodiment of the invention the composition defined above is added to the blends of polypropylene with polyethylene selected from the group consisting of high density polyethylene (HDPE), high molecular weight high density polyethylene (HMW HDPE), ultra high molecular weight high density polyethylene (UHMW HDPE), medium density polyethylene (MDPE), low density polyethylene (LDPE), linear low density polyethylene (LLDPE), branched low density polyethylene (BLDPE) and ethylene-propylene-diene terpolymers (EPDM) containing small proportions of diene.

The process is preferably carried out in an extruder by introducing the additive during processing.

Particularly preferred processing machines are single-screw extruders, contra-rotating and co-rotating twin-screw extruders, planetary-gear extruders, ring extruders or co-kneaders. It is also possible to use processing machines provided with at least one gas removal compartment to which a vacuum can be applied.

Suitable extruders and kneaders are described, for example, in *Handbuch der Kunststoffextrusion, Vol. 1 Grundlagen*, Editors F. Hensen, W. Knappe, H. Potente, 1989, pp. 3-7, ISBN:3-446-14339-4 (*Vol. 2 Extrusionsanlagen 1986, ISBN* 3-446-14329-7).

For example, the screw length is 1-60 screw diameters, preferably 35-48 screw diameters. The rotational speed of the screw is preferably 10-600 rotations per minute (rpm), very particularly preferably 25-300 rpm.

The maximum throughput is dependent on the screw diameter, the rotational speed and the driving force. The process of the present invention can also be carried out at a level lower than maximum throughput by varying the parameters mentioned or employing weighing machines delivering dosage amounts.

If a plurality of components is added, these can be premixed or added individually.

The polymers may need to be subjected to an elevated temperature for a sufficient period of time, so that the desired degradation occurs. The temperature is generally above the softening point of the polymers.

In a preferred embodiment of the process of the present invention, a temperature range lower than 280° C., particularly from about 160° C. to 280° C. is employed. In a particularly preferred process variant, the temperature range from about 200° C. to 270° C. is employed.

The period of time necessary for degradation can vary as a function of the temperature, the amount of material to be degraded and the type of, for example, extruder used. It is usually from about 10 seconds to 20 minutes, in particular from 20 seconds to 10 minutes.

In the process for reducing the molecular weight (degradation process) of the polypropylene polymers, the above-described compositions comprising hydroxylamine esters (I) and sulphur compounds (II) are present in concentrations, based on the amount of polymers to be degraded, of from about 0.001 to 5.0% by weight, in particular from 0.01 to 2.0% by weight and particularly preferably from 0.02 to 1.0% by weight. The hydroxylamine esters (I) and sulphur compounds (II) can be added as individual compounds or as mixtures to the polymer to be degraded. The ratio of hydroxylamine esters (I) and sulphur compounds (II) may vary within wide limits, e.g. from 1.0:20.0 wt. % to 20.0:1.0 wt. %, preferably 1.0:1.0 wt. % to 10.0:1.0 wt. %.

While the sometimes volatile decomposition products (smoke) of peroxides can lead to discolouration or odour in the degraded polymers, very little discolouration and odour occur in the case of the polymers degraded by means of hydroxylamine esters (I) and sulphur compounds (II).

Incorporation into the polymers can be carried out, for example, by mixing the above-described hydroxylamine esters (I) and sulphur compounds (II) or mixtures thereof and, if desired, further additives into the polymers using the methods customary in process technology.

Incorporation can, alternatively, also be carried out at temperatures, which do not yet cause decomposition of the polymers (latent compound). The polymers prepared in this way can subsequently be heated a second time and subjected to an elevated temperature for a sufficient period of time so that the desired polymer degradation occurs.

The NOR-compounds (I) and sulphur compounds (II) can also be added to the polymers to be degraded in the form of a master batch, in which these compounds are present, for example, in a concentration of from about 1.0-25.0% by weight. The master batch (concentrate) can be produced at temperatures, which do not yet cause decomposition of the compounds of the present invention.

This provides a product, which is defined by specific dosage amounts and may be compounded with other additives. The master batch can then be compounded with the polymer to be degraded at a temperature above the decomposition temperature of the hydroxylamine ester (I).

The present invention therefore further provides a concentrate in which the NOR-compounds (I) and sulphur compounds (II) are present in a concentration of 1.0-25.0% by weight and which can be added to the polymer to be degraded. The desired product is thus obtainable in an advantageous two-stage process.

In a specific embodiment, suitable additives, such as metal salts, e.g. of Ca, Fe, Zn or Cu, are added to the polymers to be degraded.

It has surprisingly been found that oxides, hydroxides and carbonates of metals in the oxidation state II aid the degrading action. Preference is therefore given to compositions which, in addition to the above-described NOR-compounds (I) and sulphur compounds (II), further comprise 0.1-10 parts of metal salt per part of NOR-compound (I). Particular preference is given to concentrations of 0.5-10 parts of metal salt selected from the group consisting of CaO, $CaCO_3$, ZnO, $ZnCO_3$, MgO, $MgCO_3$ or $Mg(OH)_2$ per part of the NOR-compound (I) and sulphur compound (II) mixture.

Apart from the hydroxylamine esters (I) and sulphur compounds (II), further additives can also be present in the polymer, e.g. sulphur based pigments like ultramarine blue, light stabilizers of the 2-(2-hydroxyphenyl)-1,3,5-triazine type which are known from the patent literature, e.g. U.S. Pat. No. 4,619,956, EP-A-434 608, U.S. Pat. No. 5,198,498, U.S. Pat. No. 5,322,868, U.S. Pat. No. 5,369,140, U.S. Pat. No. 5,298,067, WO-94/18278, EP-A-704 437, GB-A-2,297,091 or WO-96/28431. Further examples of additives are listed in WO 01/90113.

In a specific embodiment of the invention, the polymer to be degraded is prepared with addition of the above-described hydroxylamine esters (I) and sulphur compounds (II) together with selected antioxidants and processing stabilizers or mixtures of these. Examples of preferred compounds are:

Pentaerythrityl tetrakis(3-(3,5-di-tert-butyl-4-hydroxyphenyl)propionate) (Irganox® 1010), octadecyl 3-(3,5-di-tert-butyl-4-hydroxyphenyl)propionate) (IRGANOX 1076), 3,3',3',5,5',5'-hexa-tert-butyl-α,α',α'-(mesitylene-2,4,6-triyl) tri-p-cresol (IRGANOX 1330), calcium diethyl bis(((3,5-bis (1,1-dimethylethyl)-4-hydroxyphenyl)methyl)phosphonate) (IRGANOX 1425), 1,3,5-tris(3,5-di-tert-butyl-4-hydroxybenzyl)-1,3,5-triazine-2,4,6(1H,3H,5H)trione (IRGANOX 3114), tris(2,4-di-tert-butylphenyl) phosphite (Irgafos® 168), tris(nonylphenyl) phosphite, tetrakis(2,4-di-tert-butylphenyl) [1,1-biphenyl]-4,4'-diylbisphosphonite (IRGANOX P-EPQ), didodecyl 3,3'-thiodipropionate (IRGANOX PS 800), dioctadecyl 3,3'-thiodipropionate (IRGANOX PS 802); 5,7-di-tert-butyl-3-(3,4-dimethylphenyl)-3H-benzofuran-2-one (IRGANOX HP 136) and distearylhydroxylamine (Irgastab® FS 042).

Further additives are antacids, such as calcium stearate or zinc stearate, hydrotalcites or calcium lactate, calcium lactylate from Patco (Pationic®).

In a specific embodiment, further sources of free radicals, e.g. a suitable bis azo compound, a peroxide or a hydroperoxide, in addition to the hydroxylamine esters (I) and sulphur compounds (II) can be added to the polymers to be degraded.

Suitable bis azo compounds are commercially available, e.g. 2,2'-azobisisobutyronitrile, 2,2'-azobis(2-methylbutyronitrile), 2,2'-azobis(2,4-dimethylvaleronitrile), 2,2'-azobis (4-methoxy-2,4-dimethylvaleronitrile), 1,1'-azobis(1-cyclohexanecarbonitrile), 2,2'-azobis(isobutyramide) dihydrate, 2-phenylazo-2,4-dimethyl-4-methoxyvaleronitrile, dimethyl 2,2'-azobisisobutyrate, 2-(carbamoylazo)isobutyronitrile, 2,2'-azobis(2,4,4-trimethylpentane), 2,2'-azobis(2-methylpropane), 2,2'-azobis(N,N'-dimethyleneisobutyramidine) as free base or hydrochloride, 2,2'-azobis(2-amidinopropane) as free base or hydrochloride, 2,2'-azobis{2-methyl-N-[1,1-bis (hydroxymethyl)ethyl]propionamide} or 2,2'-azobis{2-methyl-N-[1,1-bis(hydroxymethyl)-2-hydroxyethyl]propionamide}.

Suitable peroxides and hydroperoxides are commercially available, e.g. acetylcyclohexane-sulphonyl peroxide, diisopropyl peroxydicarbonate, tert-amyl perneodecanoate, tert-butyl-perneodecanoate, tert-butylperpivalate, tert-amylperpivalate, bis(2,4-dichlorobenzoyl) peroxide, diisononanoyl peroxide, didecanoyl peroxide, dioctanoyl peroxide, dilauroyl peroxide, bis(2-methylbenzoyl) peroxide, disuccinoyl peroxide, diacetyl peroxide, dibenzoyl peroxide, tert-butyl per-2-ethylhexanoate, bis(4-chlorobenzoyl) peroxide, tert-butyl perisobutyrate, tert-butyl permaleate, 1,1-bis(tert-butylperoxy)-3,5,5-trimethylcyclohexane, 1,1-bis(tert-butylperoxy) cyclohexane, tert-butyl peroxyisopropyl carbonate, tert-butyl perisononaoate, 2,5-dimethyl-hexane 2,5-dibenzoate, tert-butyl peracetate, tert-amyl perbenzoate, tert-butyl perbenzoate, 2,2-bis(tert-butylperoxy)butane, 2,2-bis(tert-butylperoxy)propane, dicumyl peroxide, 2,5-dimethyl-hexane 2,5-di-tert-butylperoxid, 3-tert-butylperoxy-3-phenyl phthalide, di-tert-amyl peroxide, α,α'-bis(tert-butylperoxyisopropyl)benzene, 3,5-bis(tert-butylperoxy)-3,5-dimethyl-1,2-dioxolane, di-tert-butyl peroxide, 2,5-dimethylhexyne 2,5-di-tert-butyl peroxide, 3,3,6,6,9,9-hexa-methyl-1,2,4,5-tetraoxacyclononane, p-menthane hydroperoxide, pinane hydroperoxide, diisopropylbenzene mono-α-hydroperoxide, cumene hydroperoxide or tert-butyl hydroperoxide.

The abovementioned bis azo compounds, peroxides or hydroperoxides are added to the polymers to be degraded in amounts smaller than those customary when they are used alone in the processes of the prior art.

In a further preferred embodiment of the present invention, at least 2 different free-radical initiators having different decomposition temperatures are employed, so that the degradation of the polymers may occur in 2 stages. This process is also referred to as sequential degradation.

Suitable compositions comprise, for example, the free-radical initiators of the invention and the abovementioned peroxides or a combination of the NOR-compounds described in WO 97/49737 and the hydroxylamine esters (I) and sulphur compounds (II) described above.

It is essential that the two decomposition temperatures are sufficiently apart for effecting to a 2-stage process. For example, a peroxide having a decomposition temperature in the range of about 180-220° C. can be combined with a mixture of a hydroxylamine ester (I) and sulphur compound (II) having decomposition temperatures in the range of about 240-280° C. or a mixture of a hydroxylamine ester (I) and sulphur compound (II) having decomposition temperatures in the range of about 240-280° C. can be combined with an NOR-compound described in WO 97/49737 having a decomposition temperature above 300° C.

It is of course also possible to use mixtures of free-radical generators having different decomposition temperatures in the process.

According to a preferred embodiment the degradation is advantageously carried out in the presence of small amounts of free nitroxyl radicals. A more readily controllable degradation of the polymer is achieved, which leads to more constant melting properties. Suitable nitroxyl radicals are known and described in U.S. Pat. No. 4,581,429 or EP-A-621 878. Open-chain structures are described in WO 99/03894 and WO 00/07981. Furthermore, NO-derivatives of the piperidine type are described in WO 99/67298 and in British Patent Specification 2,335,190. Other NO-derivatives of heterocyclic compounds are described in British Patent Specification 2,342,649.

The following Examples illustrate the invention:

ABBREVIATIONS

Rpm: rotations per minute

EXAMPLES

1. Materials and Methods
1.1 Compounds and Compound Mixtures Tested 1.1.1

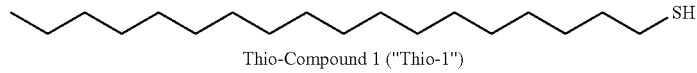

Thio-Compound 1 ("Thio-1")

1.1.2

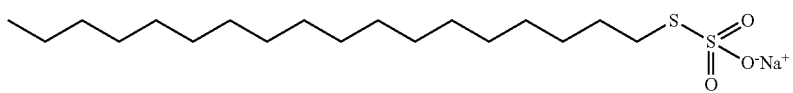

Thio-Compound 2 ("Thio-2")

1.1.2.1 Preparation of Thio-2

A 1 l flask equipped with stirrer, thermometer and a reflux condenser is charged with 116.3 g (0.3488 mol) octadecyl bromide, 55.3 g (0.3498 mol) sodium thiosulphate, 2 g tetrabutylammonium chloride, 350 ml ethanol (96%) and 175 ml water. The mixture is gently refluxed with stirring under nitrogen for 18.5 h. A clear solution is formed which is slowly cooled to 22° C. under stirring. The white precipitate is filtered off with suction and the filter cake washed with water (2×400 ml) and dried at 60° C./100 mbar. 133.82 g (98.7%) Thio-2 is obtained as a white powder.

1.1.3 Hydroxylamine Ester 1 ("NOR 1")

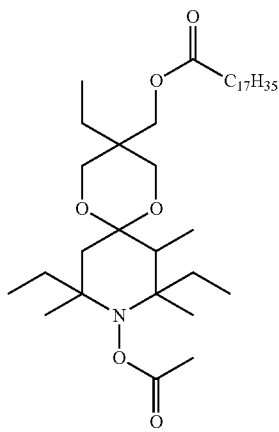

1.2 Controlled Degradation of Polypropylene by Means of Nor Compounds

After adding the additives and additive mixtures listed in Tables 1-3 and the basic level stabilization mixture (0.15% of IRGANOX B 225 and 0.05% of calcium stearate; IRGANOX® B 225: 1:1 mixture of Irgafos®168 and IRGANOX® 1010) commercial polypropylene (Moplen HF 500 N®, manufacturer: BaseII) is extruded on a twin-screw extruder ZSK 25 (Werner & Pfleiderer) at a temperature of $T_{max}=250°$ C. (heating zones 1-6), a throughput of 4 kg/h and 100 rpm. The resulting polymer is strand granulated in a water bath. The melt viscosity (MFR) is determined in accordance to ISO 1133. A large increase in the melt flow rate indicates substantial chain degradation.

2. Results

TABLE 1

2.1 (Effect of thio additive Component b))

| Examples | Additives | MFR (230/2.16) |
|---|---|---|
| A1*) | — (Control) | 16 |
| A2*) | 0.025% NOR 1 | 41 |
| A3*) | 0.05% NOR 1 | 65 |

TABLE 1-continued 2.1 (Effect of thio additive Component b))

| Examples | Additives | MFR (230/2.16) |
|---|---|---|
| A4*) | 0.025% Thio 1 | 23 |
| A5*) | 0.05% Thio 1 | 31 |
| A6 | 0.025% NOR 1 + 0.025% Thio 1 | 190 |
| A7 | 0.0125% NOR 1 + 0.0375% Thio 1 | 86 |
| A8 | 0.0375% NOR 1 + 0.0125% Thio 1 | 250**) |
| A9 | 0.05% NOR 1 + 0.05% Thio 1 | 595**) |
| A10 | 0.025% NOR 1 + 0.075% Thio 1 | 240**) |
| A11 | 0.075% NOR 1 + 0.025% Thio 1 | 940**) |

Additives added as polymer concentrates (3.3% NOR 1 in PP, 5% Thio 1 in PP);
Polymer density at 230° C. = 0.75 g/cm³;
*)Comparative Example;
**)Measured by means of a die with diameter = 1.05 mm instead of standard die in accordance to ISO 1133.

TABLE 2

2.2 (Improved degradation performance at temperatures below 250° C.)

| Examples | Additives | MFR (230/2.16) Extrusion Tmax: 210° C. | MFR (230/2.16) Extrusion Tmax: 250° C. |
|---|---|---|---|
| B1*) | — | 14 | 17 |
| B2*) | 0.033% NOR 1 | 38 | 64 |
| B3*) | 0.0062% Thio 2 | 14 | 16 |
| B4 | 0.025% NOR 1 + 0.0031% Thio 2 | 42 | 89 |
| B5 | 0.033% NOR 1 + 0.0041% Thio 2 | 62 | 119 |
| B6 | 0.05% NOR 1 + 0.0061% Thio 2 | 98 | 190 |

Additives added as polymer concentrates (3.3% NOR 1 in PP, 0.41% Thio 1 in PP);
Polymer density at 230° C. = 0.75 g/cm³;
*)Comparative Example

TABLE 3

2.3 (Influence of thio concentration on degradation performance)

| Examples | Additives | MFR (230/2.16) |
|---|---|---|
| C1*) | — | 17 |
| C2*) | 0.05% NOR 1 | 87 |
| C3 | 0.05% NOR 1 + 0.05% Thio 2 | 1400**) |
| C4 | 0.05% NOR 1 + 0.025% Thio 2 | 1160**) |
| C5 | 0.05% NOR 1 + 0.0125% Thio 2 | 430**) |
| C6 | 0.05% NOR 1 + 0.0031% Thio 2 | 170 |

Additives added as polymer concentrates (3.3% NOR 1 in PP, 0.41% Thio 1 in PP);
Polymer density at 230° C. = 0.75 g/cm³;
*)Comparative Example;
**)Measured by means of a die with diameter = 1.05 mm instead of standard die in accordance with ISO 1133.

3. Conclusion

The addition of a mixture of hydroxylamine ester (I) and thio compound (II) results in an increased degradation of polypropylene, which is reflected by higher MFR values as compared with the comparative examples.

In contrast to the use of the hydroxylamine ester (I) as a single component, the admixture with the thio compounds results in considerably higher polymer degradation (higher MFR values) at lower concentrations and even at lower processing temperatures.

We claim:

1. A composition suitable for reducing the molecular weight of polypropylene, propylene copolymers or polypropylene blends, which comprises
   a) at least one hydroxylamine ester of formula (I)

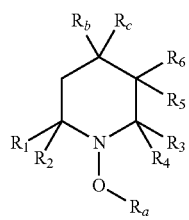

wherein $R_a$ represents acyl;
one of $R_b$ and $R_c$ represents hydrogen and the other one represents a substituent; or
$R_b$ and $R_c$ both represent hydrogen or identical or different substituents; or
$R_b$ and $R_c$ together represent oxygen;
$R_1$-$R_4$ each represent $C_1$-$C_6$alkyl; and
$R_5$ and $R_6$ each represent independently of one another hydrogen, $C_1$-$C_6$alkyl or $C_6$-$C_{10}$aryl; or
$R_5$ and $R_6$ together represent oxygen; and
   b) at least one sulphur compound of formula (II)

$$R_1\text{—S-A} \quad (II)$$

wherein $R_1$ represents an organic substituent and A represents hydrogen or the group

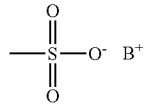

wherein $B^+$ represents a cation or a cationic group.

2. A composition according to claim 1, wherein the hydroxylamine esters of component a) are of formula (IC)

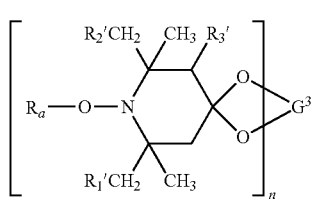

wherein n represents 1 or 2,
$R_a$ represents acyl, $R_1'$, $R_2'$ and $R_3'$ are each, independently of one another, hydrogen or methyl;
when n=1, $G^3$ is $C_2$-$C_{10}$alkylene, $C_2$-$C_8$hydroxyalkylene, $C_4$-$C_{32}$acyloxy-$C_2$-$C_{10}$alkylene or $C_4$-$C_{32}$acyloxy-$C_1$-$C_4$alkyl-$C_2$-$C_{10}$alkylene and when n=2, $G^3$ is (—$CH_2$)$_2$C($CH_2$—)$_2$.

3. A composition according to claim 1, wherein the hydroxylamine esters of component a) are of formula (IC')

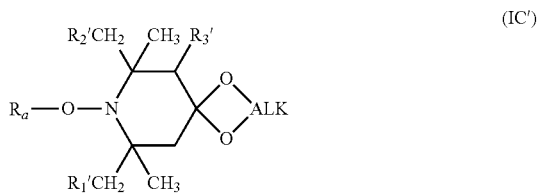

wherein $R_a$ represents acyl, $R_1'$, $R_2'$ and $R_3'$ are each, independently of one another, hydrogen or methyl; and
ALK represents $C_2$-$C_{10}$alkylene or $C_3$-$C_{10}$alkylene substituted by at least one substituent selected from the group consisting of hydroxy, $C_4$-$C_{32}$acyloxy and $C_4$-$C_{32}$acyloxy-$C_1$-$C_4$alkyl.

4. A composition according to claim 1, wherein the hydroxylamine esters of component a) are of formula (IC'')

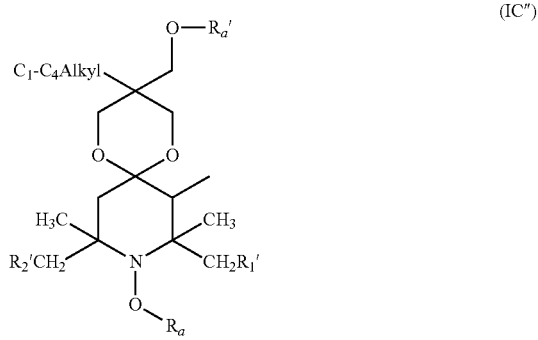

wherein $R_1'$ and $R_2'$ independently of one another represent hydrogen or methyl;
$R_a$ represents $C_1$-$C_8$ alkanoyl; and
$R_a'$ represents $C_8$-$C_{22}$alkanoyl.

5. A composition according to claim 1 herein the hydroxylamine esters of component a) are of formula (IC''')

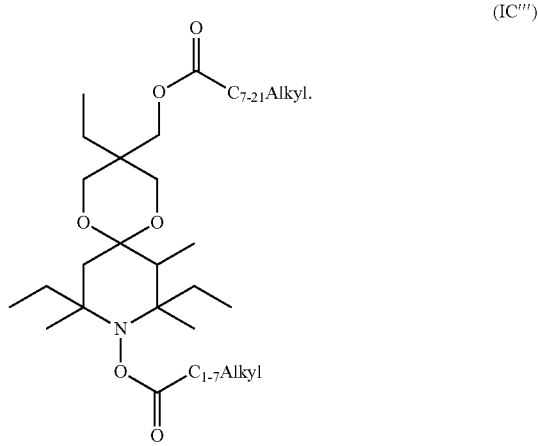

* * * * *